May 13, 1952 G. L. FERNSLER 2,596,227

FREQUENCY-MODULATED OSCILLATOR

Filed Sept. 12, 1946

Inventor
George L. Fernsler
By C. D. Tuska
Attorney

Patented May 13, 1952

2,596,227

UNITED STATES PATENT OFFICE 2,596,227

FREQUENCY-MODULATED OSCILLATOR

George L. Fernsler, Lawrenceville, N. J., assignor to Radio Corporation of America, a corporation of Delaware Application September 12, 1946, Serial No. 696,557

2 Claims. (Cl. 250—36)

This invention relates to frequency-modulated oscillators, specially those utilizing magnetrons, klystrons, or similar types of velocity-modulated tubes particularly suited for operation at ultra-high frequencies.

In certain types of radar systems, for example, there is utilized a high-frequency oscillator which is so modulated that its output frequency repeatedly sweeps over a narrow band of frequencies whose limits should, for the purpose intended, remain substantially fixed. However, due to variations in operating or ambient conditions, the band of frequencies actually swept by the oscillator tends to shift or drift with consequent impairment of the utility of the system. It is the principal purpose of the present invention to minimize such shift of the frequency-modulation range and as closely as possible to maintain correspondence between the maximum and minimum frequencies of the band with predetermined frequencies.

In accordance with the present invention, shift of the frequency-modulation band from its proper location in the frequency spectrum is minimized by an automatic control system which includes broadly resonant cavities tuned to frequencies somewhat higher and lower, respectively, than the desired high and low frequency limits of the band. From these cavities which are excited from the oscillator, preferably in push-pull relation from a third resonant cavity tuned to the desired mid-frequency of the band and suitably coupled to the oscillator, are derived direct current voltages utilized to control a voltage or current supplied to the tube for stabilization of the mean frequency of the oscillations produced thereby.

Further in accordance with the invention and more specifically, the outputs of the first-named cavities are rectified and the resulting direct current voltages applied as biasing potentials to tubes which, preferably through a direct current amplifier, determine the magnitude of a control voltage applied to a regulator tube, or equivalent, in the anode supply system, for example, of the oscillator.

The invention further resides in a frequency control system having features of combination and arrangement herein disclosed and claimed.

For a more detailed understanding of the invention, reference is made to the accompanying drawings in which.

Figures 1, 2, 3, 4, 5:
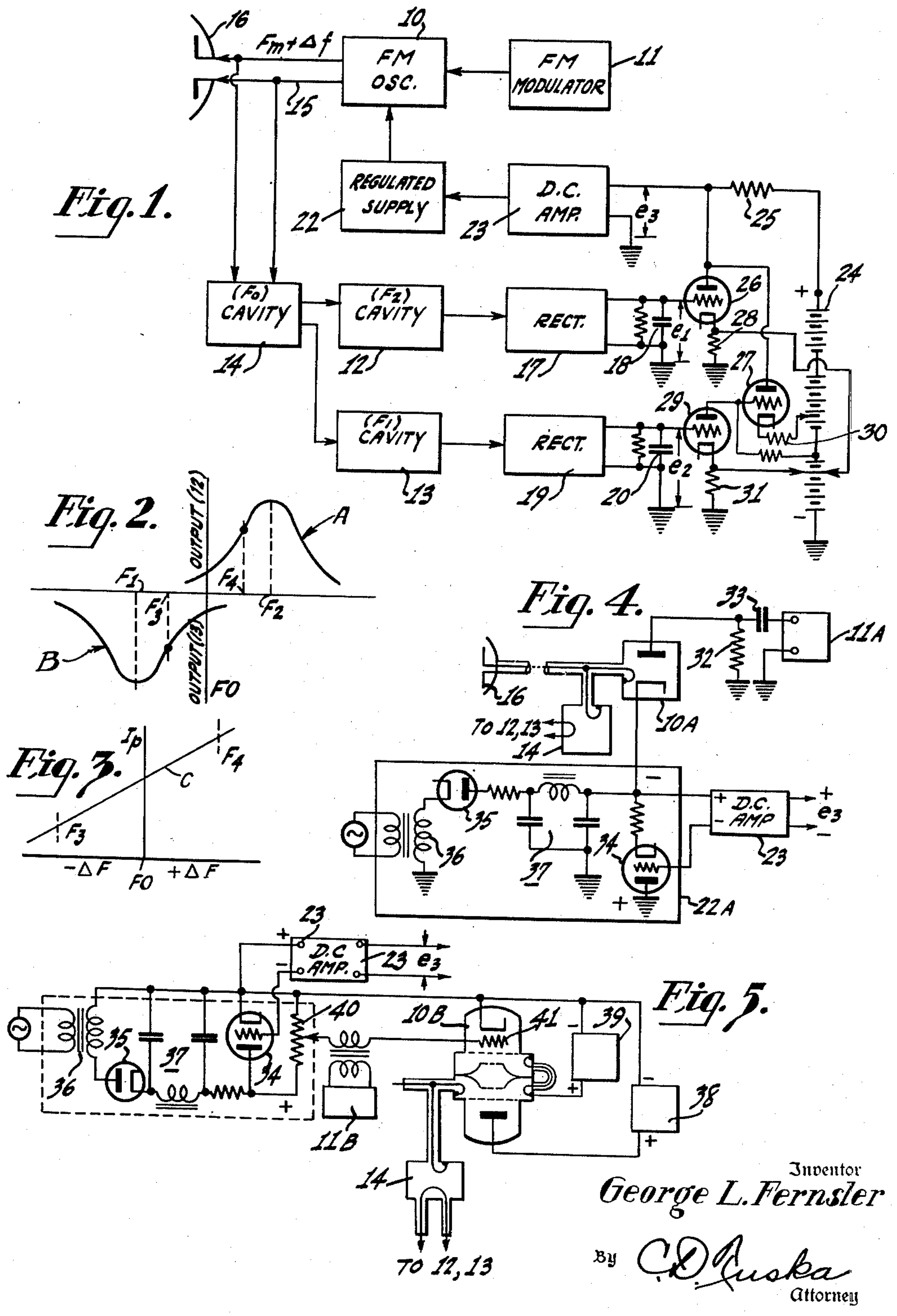
Figure 1 is a block diagram of a frequency-modulated transmitter.
Figures 2 and 3 are explanatory figures referred to in discussion of Figure 1.
Figures 4 and 5 are schematic diagrams illustrating application of the invention to oscillators utilizing a magnetron and a klystron respectively.

Referring to Figure 1, the block 10 is generically illustrative of a frequency-modulated oscillator utilizing a magnetron, klystron, or other velocity-modulated tube embodying or associated with resonant cavity structures. The modulator 11 causing the output of oscillator 10 repeatedly to sweep over a predetermined range of frequency may be of any suitable type known in the art. It may, for example, include a sweep-frequency generator whose output is introduced into resonant cavity structure of the oscillator.

For the purpose of explanation, it is assumed that the desired lower and upper frequency limits of the band swept by the oscillator 10 are respectively the frequencies F3 and F4 which may, for example, be 3495 megacycles and 3505 megacycles, respectively. The mean oscillator frequency $Fm$ depends upon several factors such as the physical dimensions of the resonant cavity structures of the oscillator, the operating currents or voltages supplied to the tube, the load of the tube, and, in the case of magnetrons or equivalent tubes, the strength of a magnetic field. Variation of any one or more of these factors causes the band of frequencies $(Fm+\Delta F)$ to drift away from the desired location in the frequency spectrum.

To minimize this drift, the oscillator 10 is provided with a control system including the broadly resonant cavities 12 and 13 which are tuned respectively to frequencies F1 and F2, the former somewhat lower than the anticipated downward drift of the lower frequency F3 of the frequency-modulation band and the frequency F2 somewhat higher than the anticipated upward drift of the upper frequency limit F4 of that band. Both cavities 12 and 13 are continuously excited from the oscillator 10; preferably they are excited in push-pull relation from a resonant cavity 14 tuned to the normal or desired mean frequency F0 of the oscillator. As shown, the cavity 14 may be excited by suitably coupling it to the concentric line or wave guide 15 extending from the oscillator 10 to the antenna 16 or other load.

The curve A of Figure 2 represents the broad resonance curve of cavity 12 and the curve B represents the broad resonance curve of cavity 13. When the frequency $Fm$ of the oscillator 10 corresponds with the frequency F0 to which the cavity 14 is tuned, the energies received by the cavities 12 and 13 are equal: under this condition, the frequency $Fm+\Delta F$ corresponds with the frequency F4 and the frequency $Fm-\Delta F$ corresponds with the frequency F3. That is, the band of frequencies $Fm+\Delta F$ swept by the oscillator corresponds with the band of frequencies between the frequency F3 and the frequency F4. If, however, the frequency-modulated range of the oscillator 10 shifts to a higher means frequency, the frequency $Fm+\Delta F$ more closely approaches the frequency F2 with resultant increase of energy in the cavity 12; this same sense of drift of the mean frequency causes the frequency $Fm-\Delta F$ further to depart from the resonant frequency F1 of cavity 13 with consequent reduction of the energy in that cavity. Briefly stated, a shift of the frequency-modulation band $(Fm+\Delta F)$ toward the frequency F2 causes the energies in cavities 12 and 13 concurrently to increase and decrease, respectively: for such upward shift of the frequency-modulation band, both the upper and lower limits of the band move to equal extends upwardly in frequency. Conversely when the frequency range swept by the oscillator 10 drifts toward the frequency F1, the energy in cavity 13 is increased with concurrent decrease of the energy in cavity 12: for such downward drift of the frequency-modulation band, both the upper and lower limits of the band move to like extents downwardly in frequency.

The output of cavity 12 is converted by rectifier 17, preferably of the crystal type, to uni-directional current impulses which are integrated in the resistance-capacitance network 18 to provide a direct-current voltage $e_1$. Similarly, the output of the cavity 13 is converted by rectifier 19 into unidirectional impulses which are integrated by resistance-capacity network 20 to provide a direct-current voltage $e_2$. Accordingly, the magnitudes of the voltages $e_1$ and $e_2$ vary differentially in accordance with the sense of any shift of the band of frequencies $Fm\pm\Delta F$ from the desired location in the frequency spectrum and to extents definitely related to the extent of the shift. These voltages are utilized jointly to determine, in manner specifically later described, the magnitude of a control voltage $e_3$ applied to the regulator of a power source 22 which supplies current to the oscillator 10. Preferably, and as hereinafter appears, the voltage $e_3$ is the input voltage of a direct-current amplifier 23 whose amplified output is applied to a regulator tube or equivalent in the power supply 22.

The input circuit of the amplifier 23 includes a suitable source 24 of fixed, direct-current voltage and a series resistor 25, the current through which is varied in accordance with the concurrent magnitudes of the control voltages $e_1$ and $e_2$. In series with the resistor 25 and in shunt to the input terminals of the amplifier 23 there are two parallel current paths, one afforded by the tube 26 and the other by the tube 27. The total biasing voltage applied to the grid of tube 26 includes the voltage $e_1$ which, as above described is variable in magnitude depending upon the difference between frequencies F2 and $Fm+\Delta F$. The total biasing voltage applied to the control grid of tube 27 includes a variable voltage-drop between the anode and cathode of tube 29. The last-named, variable component of the grid-biasing voltage of tube 27 varies as a function of the control voltage $e_2$ derived from cavity 13 and utilized as the variable component of the biasing voltage for the grid of tube 29.

The various operating voltages for the tubes 26, 27 and 29 including the biasing voltages derived from the cathode resistors 28, 30 and 31 are so selected or adjusted that as long as the range of frequency $Fm\pm\Delta F$ swept by the oscillator 10 bears with respect to the frequencies F1 and F2 the relation shown in Figure 2, the control voltage $e_3$ remains constant. If, however, the frequency-modulated band drifts as a whole toward frequency F1 or F2 the current through resistor 25 is increased or decreased under control of the tubes 26 and 27 to increase or decrease the control voltage $e_3$ in the proper sense and to the extent required to return the mean frequency F$m$ of the oscillator into substantial correspondence with the desired mean frequency F0.

The sense and extent to which the control voltage $e_3$ must be changed to compensate for drift of the band $Fm\pm\Delta F$ depends upon the characteristics of the particular oscillator. Referring to Figure 3, the curve C is exemplary of the current-input/frequency characteristic of a particular magnetron. As there appears, the anode current $I_p$ of this tube is a substantially linear function of frequency and has a positive slope; that is, the frequency increases with increase in anode-current. Automatically to control the mean frequency of this oscillator therefore requires that for positive deviation of the frequency F$m$ of the oscillator the anode current should be proportionally reduced, and conversely for negative deviation of the mean frequency F$m$ of the oscillator its anode current should be proportionally increased.

Whether the control-voltage $e_3$ should be increased or decreased to correct for an upward shift of the frequency-modulation band of the oscillator depends upon the type regulator included in the power supply. Assuming the shunt type regulator shown in Figure 4, the desired compensation for frequency drift of a magnetron having the current-input/frequency characteristic shown in Figure 3 is effected by providing that the control voltage $e_3$, derived as in Figure 1, shall decrease for drift of the band toward the resonant frequency F2 of cavity 12 and shall increase for drift of the band toward the resonant frequency F1 of cavity 13.

The supply source 22A of Figure 4 is of conventional type comprising a rectifier tube 35, a power transformer 36 and a filter 37 with the regulator tube 34 included in a shunt or bleeder circuit whose resistance is varied by variation of the control-voltage $e_3$ derived, as above described, from the resonant cavities 12 and 13. As the grid of tube 34 is made more negative or less positive with respect to its cathode under influence of voltage $e_3$, the anode current of tube 34 decreases, so decreasing the internal voltage drop of the power supply 22A with consequent increase of the voltage supplied the magnetron 10A; conversely, when the grid of tube 34 becomes less negative or more positive, the anode current of tube 34 increases with consequent decrease of the voltage supplied to the frequency-modulated magnetron 10A.

Figure 5 illustrates one method of utilizing the invention to correct for drift of the frequency-modulation band of a klystron oscillator. The control-voltage $e_3$ derived from resonant cavities as discussed in connection with Figure 1, is utilized to control the biasing voltage of the accelerator grid 41 of the klystron 10B, which may be of the double-cavity type shown or of the single-cavity reflex type. Upon the direct-current voltage of the accelerator grid as determined by the setting of the tap or adjustable contact of voltage-dividing resistor 40 and upon the internal resistance of regulator tube 34 is superimposed the alternating-current voltage, derived from the sweep generator 11B or equivalent, which effects frequency-modulation of the oscillator. The modulation frequency, as is also the case in Figures 1 and 4, is high compared to any change of the mean frequency due to action of the regulator tube in response to variations of the control-voltage $e_3$. By way of example, the modulation frequency may be 120 cycles per second and cause the oscillator frequency to sweep over a range of 10 megacycles in less than 0.05 second whereas the drift corrected by the application of the control-voltage $e_3$ to regulator tube 34 is much slower.

From the general discussion and specific examples described, the manner of applying the invention to oscillator tubes having different current-input/frequency characteristics and difference of regulated power supplies will be apparent to those skilled in the art.

It is to be understood therefore, the invention is not limited to the particular systems disclosed but is coextensive in scope with the appended claims.

I claim as my invention:

1. A system for minimizing drift of a band of frequencies swept by a frequency-modulated oscillator comprising a resonant cavity tuned to the desired mid-frequency of said band and excited from the output of said oscillator, two broadly resonant cavities coupled in push-pull relation to said first-named cavity and tuned respectively to frequencies higher and lower than the desired high and low frequency limits of said band, regulating means for determining the mean frequency of the oscillator output, and means for deriving from said cavities control voltages jointly applied to change the regulation point of said regulating means.

2. A system for minimizing drift of a band of frequencies swept by a frequency-modulated oscillator comprising a resonant cavity tuned to the desired mid-frequency of said band and excited from the output of said oscillator, two broadly resonant cavities coupled to said first-named cavity and tuned to frequencies beyond the desired limits of said band, rectifier means for concurrently deriving from said cavities direct-current voltages differentially varied in accordance with shift of said band with respect to the resonant frequencies of said cavities, and regulating means for determining the mean frequency of the oscillator output controlled by the resultant of said voltages.

GEORGE L. FERNSLER.

REFERENCES CITED

The following references are of record in the file of this patent:

UNITED STATES PATENTS

| Number | Name | Date |
|---|---|---|
| 2,262,932 | Guanella | Nov. 18, 1941 |
| 2,296,962 | Tunick | Sept. 29, 1942 |
| 2,337,214 | Tunick | Dec. 21, 1943 |
| 2,404,568 | Dow | July 23, 1946 |
| 2,413,939 | Benware | Jan. 7, 1947 |
| 2,414,100 | Hansen | Jan. 14, 1947 |

FOREIGN PATENTS

| Number | Country | Date |
|---|---|---|
| 116,110 | Australia | Nov. 19, 1942 |